United States Patent [19]

Stumpe, Jr. et al.

[11] 3,978,165

[45] Aug. 31, 1976

[54] ELASTOMERIC BLEND

[75] Inventors: Nelson A. Stumpe, Jr.; Henry E. Railsback, both of Bartlesville, Okla.

[73] Assignee: Phillips Petroleum Company, Bartlesville, Okla.

[22] Filed: Apr. 14, 1975

[21] Appl. No.: 567,957

[52] U.S. Cl. ............................. 260/894; 156/128 T
[51] Int. Cl.² ...................... C08L 9/00; C08L 47/00
[58] Field of Search ..................................... 260/894

[56] References Cited
UNITED STATES PATENTS

| | | | |
|---|---|---|---|
| 3,725,331 | 4/1973 | Lesage et al. | 260/894 |
| 3,827,991 | 8/1974 | Aido et al. | 260/894 |

OTHER PUBLICATIONS

"Rubber Age", Mar. 1973, vol. 105, No. 3, pp. 25–29.
"European Rubber Journal", Dec. 1973, vol. 155, No. 12, pp. 38–48.
"Chemical & Engineering News", June 24, 1974, vol. 52, No. 25, pp. 1, 2 & 13.
"Rubber Age", Apr. 1974, vol. 106, No. 4, pp. 4, 33 & 40.

*Primary Examiner*—Wilbert J. Briggs, Sr.
*Assistant Examiner*—J. Ziegler

[57] ABSTRACT

A rubbery composition of matter comprises a blend of three components, A, B and C, wherein component A comprises a rubbery homopolymers of 1,3-butadiene in an amount in the range of from about 10 to about 60 parts by weight based on weight of the blend, the homopolymer characterized by having at least 35 percent of the polymer in the cis configuration; component B comprises a rubbery 1,3-butadiene-styrene copolymer in an amount in the range of from about 15 to about 65 parts by weight based on weight of the blend; and component C comprises a medium vinyl homopolymer of 1,3-butadiene in an amount in the range of from about 25 to about 75 parts by weight based on weight of the blend, the homopolymer characterized by having at least 30 but not more than 50 percent of the polymer in the vinyl configuration.

6 Claims, 1 Drawing Figure

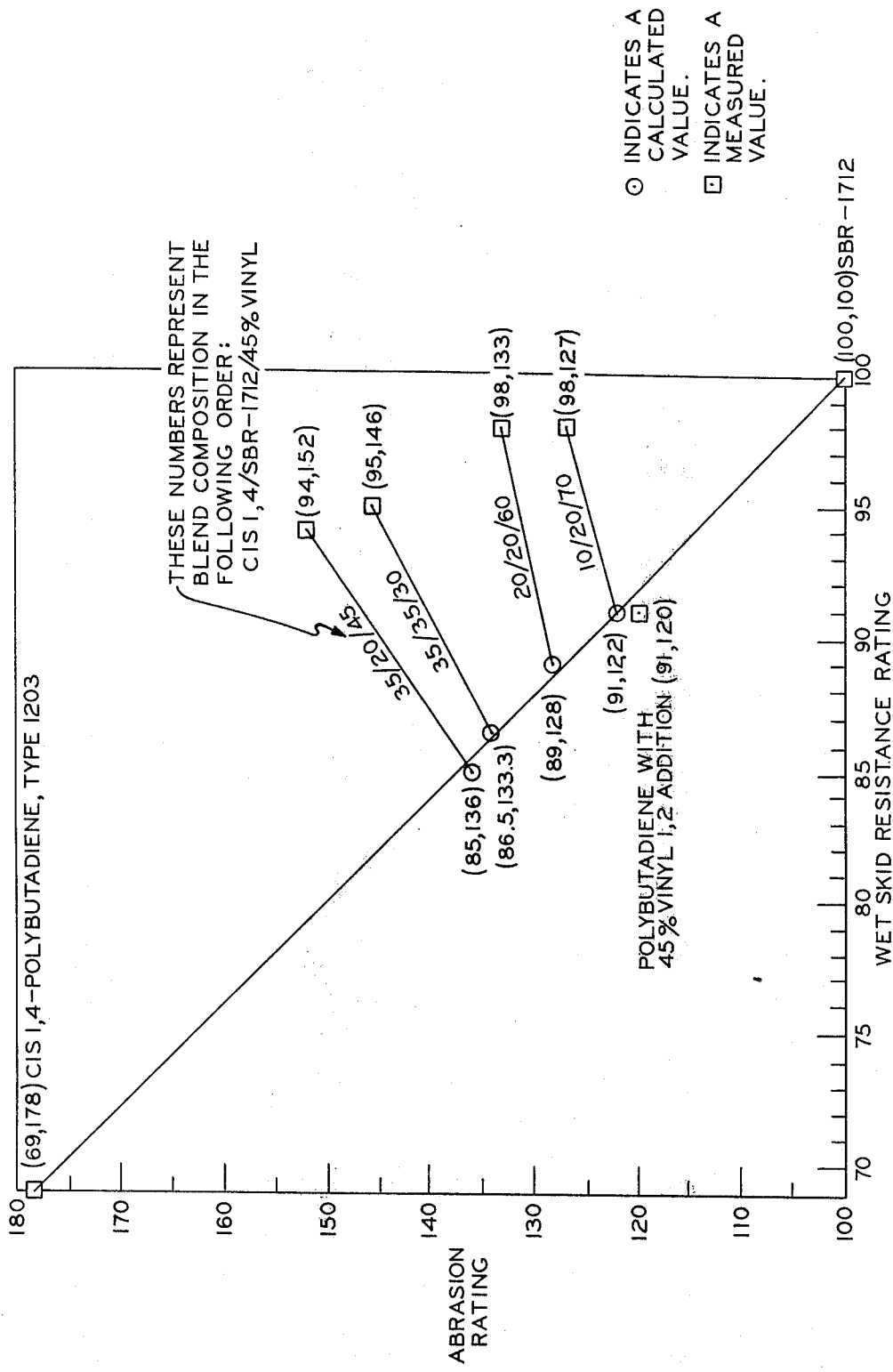

ELASTOMERIC BLEND

BACKGROUND OF THE INVENTION

The invention relates to a three-component blend of elastomers. In another aspect the invention relates to a blend of elastomers suitable for use in automobile tires.

With the advent of the energy crisis and the rather sudden demand for aromatic compounds to eliminate the requirement for alkyl lead compounds as antiknocking agents in gasoline, the effect on the supply and price of the most widely used general purpose synthetic rubber, styrene-butadiene rubber, referred to herein as SBR, is understandable. Due to this shortage of styrene, efforts have been directed to find substitutes for SBR in various applications. It is known that tires made of medium vinyl polybutadienes, that is, those with a vinyl content ranging from about 35 to about 55 percent 1,2configuration, are approximately equal to tires made of SBR or cis polybutadiene-SBR blends.

Blending of various elastomers in order to obtain a blend with a balance of properties is well known in the art. In most instances a blend of two or more rubbers will result in a predictable compromise of properties. Therefore it was surprising to find a tertiary blend of elastomers with properties exceeding those normally expected.

It is an object of the invention to obtain a blend of elastomers suitable for use in various applications, such as for use in automobile tires.

Another object of the invention is to obtain a blend of elastomers suitable for use in making automobile tires which contains less styrene units than the elastomeric blends generally used for making automobile tires.

SUMMARY

In accordance with the invention a rubbery composition of matter comprises a blend of three components, A, B and C, wherein component A comprises a rubbery homopolymer of 1,3-butadiene in an amount in the range of from about 10 to about 60 parts by weight based on weight of the blend, the homopolymer characterized by having at least 35 percent of the polymer in the cis configuration; component B comprises a rubbery 1,3-butadiene-styrene copolymer in an amount in the range of from about 15 to about 65 parts by weight based on weight of the blend; and component C comprises a medium vinyl homopolymer of 1,3-butadiene in an amount in the range of from about 25 to about 75 parts by weight based on weight of the blend, the homopolymer characterized by having at least 30 but not more than 50 percent of the polymer in the vinyl configuration.

BRIEF DESCRIPTION OF THE DRAWING

The drawing represents a graph of the data tabulated in Table II and Table III.

DETAILED DESCRIPTION

The inventors have found a unique tertiary blend of elastomers possessing properties such as abrasion resistance and wet skid resistance substantially exceeding the values predicted for both abrasion resistance and wet skid resistance. None of the individual elastomers is considered new; only the blend of all three elastomers is considered new.

The rubbery homopolymer of 1,3-butadiene utilized in accordance with the invention is characterized as having at least 35 percent of the polymer in the cis configuration and hereinafter designated component A. It is preferred to employ a cis 1,4-polybutadiene having at least 85 percent of the polymer in the cis configuration because such a polybutadiene, hereinafter designated as a high cis polybutadiene, has a slightly higher abrasion resistance value than a polybutadiene with a lower cis content; however, it is understood that it is within the scope of the invention to use a medium cis polybutadiene, i.e., a polybutadiene having from about 35 to 85 percent of the polymer in the cis configuration and a vinyl content of no more than about 15 percent. Among the more common catalysts employed for the solution polymerization of medium cis polybutadienes are the various alkyl lithium compounds as known in the art. High cis polybutadienes are normally prepared by the solution polymerization of 1,3-butadiene in the presence of a catalyst composition comprising (a) a trialkylaluminum and (b) titanium tetraiodide as known in the art. The polybutadiene thus produced contains as high as 90 percent and higher cis 1,4-addition. Component A may also be produced by polymerizing 1,3-butadiene in the presence of a catalyst composition (a) a cobalt compound, (b) an aluminum halide, and (c) an organotin compound; or component A can be produced by polymerizing 1,3-butadiene in the presence of a catalyst composition comprising (a) a nickel salt of an organic acid, (b) boron trifluoride etherate, and (c) an organometallic compound of aluminum also known in the art. Thus component A used in the invention can be produced using a variety of catalyst compositions. One rubber suitable for use as component A is known in the art as type 1203 solution butadiene dry rubber and the specifications for it are found on page 656 of part 37 of the 1974 Edition of ASTM Standards. Specifications for type 1203 include a cis configuration of 93 percent and a Mooney viscosity at 212°F of 45 ML-4. Component A can be compounded to form tire treads which have excellent abrasion resistance but which have lower skid resistance than other elastomers, for example, emulsion polymerized butadiene-styrene copolymers generally known in the art as SBR-1712.

The rubbery copolymer of 1,3-butadiene and styrene utilized in accordance with the invention, hereinafter designated component B, is well known in the art. It is prepared by either the well-known solution or emulsion polymerization processes and contain from about 15 to about 30 weight percent bound styrene. One of the more common copolymers is known as SBR-1712 which is an emulsion polymerized copolymer. Specifications for SBR-1712 are found on page 653 of Part 37 of the 1974 Edition of ASTM Standards entitled "Rubber-Test Methods". Specifications for SBR-1712 include a target concentration of 23.5 weight percent bound styrene, a nominal Mooney viscosity of 55 ML-4 at 212°F, and an extender oil target concentration of 37.5 parts per 100 parts rubber. Compounded into tire treads by itself, it has excellent skid resistance but has lower abrasion resistance than many other elastomers such as the above-described cis 1,4-polybutadiene.

The third component of the tertiary blend of the invention, hereinafter referred to as component C, is a medium vinyl polybutadiene. It is normally prepared by the solution polymerization of 1,3-butadiene in the presence of (a) a catalyst composition comprising an organolithium compound and (b) a polar compound as known in the art. Addition of the polar compound is effective in lowering the ratio of cis to vinyl linkages in the resultant polybutadiene. By varying the amount of the polar compound in the 1,3-butadiene solution polymerization reactor, the medium vinyl polybutadiene can be produced with the required vinyl configuration ranging from about 30 to about 50 percent. When compounded into tire treads, medium vinyl polybutadiene has an abrasion rating better than SBR-1712 but the rating is not as good as the rating for cis polybutadiene (component A); however, medium vinyl polybutadiene has a wet skid resistance rating better than cis polybutadiene but the rating is not as good as the rating for SBR-1712.

As used in the invention, components A, B and C as defined above are normally blended wherein the amount of A ranges from about 10 to about 60 parts by weight based on weight of the blend; however, amounts ranging from about 20 to about 40 parts have been used. The amount of component B in the blend normally ranges from about 15 to about 65 parts by weight based on weight of the blend; however, amounts in the range of about 15 to about 40 parts have been used. Amounts of component C in the blend normally range from about 25 to about 75 parts by weight based on weight of the blend; however, amounts in the range of from about 25 to about 50 parts have been used. As used throughout this disclosure, all of the amounts or the ranges for the components of the blends of the invention specified herein are expressed on a rubber hydrocarbon basis, that is, where an oil-extended rubber or masterbatch is used as a component in a blend, the amount of rubber in the masterbatch is the basis for determining the amount of masterbatch to use. Also, the individual rubbers, masterbatches or blends were vulcanized using the well-known sulfur curing system which is not considered a part of or a limitation on the present invention.

Normally the blends of the invention are compounded using various materials depending upon the intended use of the rubber. For example, various rubber extender oils, carbon blacks, etc., are generally used for compounding the rubber of the invention for use as tires.

Components A, B and C were each compounded into tire tread stocks using the recipes reported in Table I. Component A was a polybutadiene having 93 percent of the polymeric units in the cis configuration. Component B was an SBR-1712 and thus had approximately 23.5 weight percent styrene units. Component C was a medium vinyl polybutadiene having 45 percent of the polymeric units in the vinyl configuration. It is noted that two recipes are given for SBR-1712: B-1 for comparison with A and B-2 for comparison with C.

Table I

| Rubber Component | A<br>Cis 1,4-<br>Poly-<br>butadiene | B-1<br>SBR-<br>1712 | B-2<br>SBR-<br>1712 | C<br>Vinyl<br>Poly-<br>butadiene |
|---|---|---|---|---|
| Recipe Components, Parts by Weight | | | | |
| Rubber | 100 | 0 | 0 | 0 |
| Masterbatch, 100 parts rubber, 37.5 parts oil[2] | 0 | 137.5 | 137.5 | 137.5 |
| Carbon Black, N220[1] | 70 | 70 | — | — |
| Carbon Black, N339[1] | — | — | 75 | 75 |
| Oil[2] | 40 | 2.5 | 7.5 | 7.5 |
| Zinc Oxide | 5 | 5 | 3 | 3 |
| Stearic Acid | 2 | 2 | 2 | 2 |
| Flexamine G[3] | 1 | — | — | — |
| Winsgstay 100[4] | — | 1 | 1 | 1 |
| Santoflex AW[5] | — | 2 | 2 | 2 |
| Sunolite 666B[6] | — | — | 2 | 2 |
| Paraffin Wax | — | 2 | — | — |
| Sulfur | 2.2 | 2.1 | 2.1 | 2.1 |
| NOBS Special[7] | 1.3 | 1.3 | — | — |
| Santocure NS[8] | — | — | 0.85 | 0.9 |
| Raw rubber[9] Mooney, ML-4 at 212°F | 45 | 47 | 53 | 43 |

| | Compounding | | | |
|---|---|---|---|---|
| | A<br>Cis 1,4-<br>Poly-<br>butadiene | B-1<br>SBR-<br>1712 | B-2<br>SBR-<br>1712 | C<br>Vinyl<br>Poly-<br>butadiene |
| Banbury Type | 1-A | Br | 1-A | 1-A |
| No. of Mixes | 1 | 3 | 1 | 1 |
| Mix Time, Minutes | 8', 10'' | 3' | 7', 45'' | 4' |
| Dump Temp, °F | 310 | 305 | 330 | 330 |
| ML-4 at 212°F[9] | 59 | 56 | 55 | 79 |
| Scorch at 280°F,[10] min (+5) | 21 | 20 | 13 | 10 |

| | Extrusion at 195°F | | Extrusion at 250°F | |
|---|---|---|---|---|
| in/min[11] | 48 | 49 | 34 | 42 |
| g/min[11] | 108 | 112 | 80 | 77 |
| rating[11] | 10 | 10 | 10 | 12 |
| Feed[11] | 4 | 5 | 8 | 6 |

| | Cured 30 Minutes at 307°F | | | |
|---|---|---|---|---|
| Compression Set, %[12] | 22 | 21 | 20 | 14 |
| 300% Modulus, psi[13] | 730 | 1170 | 1370 | 1210 |
| Tensile, psi[13] | 2360 | 3180 | 3080 | 2740 |
| Elongation, %[13] | 620 | 600 | 560 | 560 |
| Heat buildup ΔT, °F[14] | 69 | 68 | 81 | 73 |

Table I-continued

| | | | | |
|---|---|---|---|---|
| Resilience, %[13] | 59 | 50 | 52 | 60 |
| Shore A Hardness[16] | 57 | 60 | 57 | 57 |

[1] ASTM D 1765-71
[2] Highly aromatic rubber extender oil
[3] Physical mixture containing 65 weight percent of a complex diarylamine-ketone reaction product and 35 weight percent of N,N'-diphenyl-p-phenylene-diamine
[4] Diaryl-p-phenylenediamine
[5] 6-Ethoxy-1,2-dihydro-2,2,4-trimethylquinoline
[6] A blend of waxy hydrocarbons from Witco Chemical
[7] N-oxydiethylene-2-benzothiazyl sulfenamide
[8] n-tert-butyl-2-benzothiazole sulfenamide
[9] ASTM D 1646-61, Mooney Viscometer, large rotor, 4 minutes
[10] ASTM D 1641-61, Mooney Viscometer, large rotor, scorch was time in minutes to obtain a 5-point rise above minimum Mooney
[11] No. ½ Royle extruder with Garvey Die. See Ind. Eng. Chem. 34, 1309 (1942). Regarding the "rating" figure, 12 designates an extruded product considered to be perfectly formed whereas lower numerals indicate less perfect products.
[12] ASTM D 395-55, Method B modified. Compression devices were used with 0.325-inch spacers to give a static compression for the one-half inch pellet of 35 percent. Test was run for 2 hours at 212°F plus relaxation for 1 hour at 212°F.
[13] ASTM D 412-51T. Scott tensile machine CRE-2K. Tests were made at 80°F.
[14] ASTM D 623-52T. Method A, Goodrich flexometer, 143 psi load, 0.175 inch stroke. Test specimen was a right circular cylinder 0.7 inch in diameter and 1 inch high.
[15] ASTM D 945-55 Yerzley oscillograph. Test specimen same as for (14) above.
[16] ASTM D 676-55T. Shore durometer, Type A.

Components A and B-1 as compounded above were each made into tire retreads and applied to freshly buffed new tires (4-ply nylon tubeless, bias-type) and cured 1 hour and 10 minutes at 300°F. Test conditions were as follows: tire size, 8.25 × 14; load, 1250 lb/tire; speed, 60 mph; inflation, 28 psig; and rim width, 6 inches. The abrasion ratings tabulated in Table II were obtained by measuring tread wear after 4400 miles of testing.

The SBR-1712, component B-1, averaged 51.6 miles per 0.001 inch of tread wear and was assigned an arbitrary abrasion resistance rating of 100. The cis-polybutadiene, component A, averaged 91.6 miles per 0.001 inch of tread wear which gives it an abrasion resistance rating of 178 in comparison to the rating of component B-1.

In a separate set of tests but under similar conditions, component C was compared with component B-2 as follows: each rubber compound was made into tire retreads and applied to freshly buffed new tires (4-ply polyester tubeless, bias-type, and cured for 1 hour and 10 minutes at 310°F. Test conditions were: tire size H78 × 15, load 1360 lb/tire, speed for first 4000 miles was the posted speed on Texas highways and from 4000 to 8000 miles, the test duration, was 55 mph, inflation was 28 psig, and the rim width was 6 inches.

The SBR-1712, component B-2, averaged 50.7 miles per 0.001 inch of tread wear and was assigned the arbitrary abrasion resistance rating of 100. The medium vinyl polybutadiene averaged 60.8 miles per 0.001 inch of tread wear which gives it an abrasion resistance rating of 120 in comparison to the rating for B-2.

Wet skid resistance values were measured by retreading two whole tires with each of compounds A, B-1, B-2 and C. The tires were tested on the front wheels only for compounds A and B-1 and on the rear wheels only for compounds C and B-2. Standard automobiles were used which were operated on wet concrete surfaces. Operating speeds of 18 to 30 miles per hour were used with a minimum of three runs at at least three speed levels. The vehicle was stopped under "panic" braking conditions. A plot of stopping distance versus speed was made, and the stopping distance for speeds of 20, 25 and 30 miles per hour was taken from the graph. The three stopping distances for speeds of 20, 25 and 30 miles per hour were added together and averaged to obtain the numbers reported, adjusted to reflect the arbitrary value of 100 for the tires compounded from SBR-1712.

A summary of the ratings for both the wet skid resistance and abrasion for tires made of the three individual components is presented below in Table II.

Table II

Abrasion and Wet Skid Resistance Values For Individual Components

| Rubber Component | Abrasion Value | Wet Skid Value on Concrete |
|---|---|---|
| A, Cis 1,4-polybutadiene | 178 | 69 |
| B, SBR-1712 | 100 | 100 |
| C, 45% Vinyl Polybutadiene | 120 | 91 |

Using values in Table II for the individual components, values were calculated for various blends for comparison with measured values in order to determine if the blends were better in properties than expected.

For example, the calculated abrasion value for a three-way blend of 30 parts by weight of 45 percent vinyl polybutadiene, 35 parts by weight cis 1,4 and 35 parts by weight SBR-1712 (on an oil-free basis) is calculated as follows:

$$0.30(120) + 0.35(178) + 0.35(100) = 36 + 62.3 + 35 = 133.3$$

The measured abrasion and wet skid resistance ratings for the tertiary blends of the invention were determined in a manner comparable to that which was used to determine the ratings for the individual components reported in Table II above.

A comparison of calculated and measured values is shown in Table III below.

Table III

| 3-Way Blends, Parts by Weight Based on Oil-free Basis | | | Abrasion Rating Values | | Wet Skid Resistance Values | |
|---|---|---|---|---|---|---|
| Cis-1,4 Poly-butadiene | SBR-1712 | 45% Vinyl Poly-butadiene | Calcu-lated | Mea-sured | Calcu-lated | Mea-sured |
| 35 | 35 | 30 | 133.3 | 146 | 86.5 | 95 |

Table III-continued

| 3-Way Blends, Parts by Weight Based on Oil-free Basis | | | Abrasion Rating Values | | Wet Skid Resistance Values | |
|---|---|---|---|---|---|---|
| Cis-1,4 Poly- butadiene | SBR- 1712 | 45% Vinyl Poly- butadiene | Calcu- lated | Mea- sured | Calcu- lated | Mea- sured |
| 35 | 20 | 45 | 136 | 152 | 85 | 94 |
| 20 | 20 | 60 | 128 | 133 | 89 | 98 |
| 10 | 20 | 70 | 122 | 127 | 91 | 98 |

In the attached drawing is a graph of abrasion rating versus wet skid resistance rating for the individual components and the calculated and measured ratings for the blends. Since it is desirable to have both a high abrasion rating and a high wet skid resistance rating it is apparent that the 35/20/45 and 35/35/30 blends were the best tire rubber blends. It is equally apparent that the measured ratings of all of the blends of Table III were substantially higher than the calculated values. Generally calculated ratings for rubbery blends are close to the measured ratings and calculation of the ratings is frequently used as a tool for determining the proportions of rubbers to obtain a blend with specific properties. Therefore the substantial differences between the calculated and measured ratings for the tertiary blends shown in Table III and in the attached drawing were surprising.

It is noted that the above-described blends and those hereinafter described were compounded employing the compounding recipe as was used for rubber component B-2 of Table I above except for minor adjustments in the amount of Santocure NS in order to maintain similar modulus and hardness in the tire treads.

As further support for the unobviousness of the measured ratings for the tertiary blends of the invention, binary blends were prepared using the individual rubbers which were used for the tertiary blends of Table III. The binary blends were tested.

The calculated and measured ratings for the binary blends, using a rating of 100 for the wet skid resistance and abrasion ratings for SBR-1712, are in Table IV as follows:

Table IV

| 2-Way Blends, Parts by Weight Based on Oil-free Basis | | | Abrasion Rating Values | | Wet Skid Resistance Values | |
|---|---|---|---|---|---|---|
| Cis-1,4 Poly- butadiene | SBR- 1712 | 45% Vinyl Poly- butadiene | Calcu- lated | Mea- sured | Calcu- lated | Mea- sured |
| 35 | 65 | 0 | 127 | 134 | 89 | 85 |
| 0 | 15 | 85 | 117 | 113 | 92 | 100 |
| 0 | 35 | 65 | 113 | 107 | 94 | 95 |
| 0 | 55 | 45 | 109 | 106 | 96 | 99 |

By comparing the differences in the measured and calculated ratings in Table IV with the differences in the ratings of Table III it is clear that the differences in the ratings for the tertiary blends of the invention are approximately twice as large as the differences in the ratings for the binary blends.

Another series of tests were conducted with tertiary blends of rubbers using the same cis 1,4-polybutadiene and SBR-1712 as was used in the previous tests, but the medium vinyl polybutadiene contained 54 percent vinyl units. The 54 percent medium vinyl polybutadiene had an abrasion resistance of 101 and a wet skid resistance value of 92 compared to the ratings for SBR-1712. The tests were conducted similar to the previous tests. The results are reported in Table V below:

Table V

| 3-Way Blends, Parts by Weight Based on Oil-free Basis | | | Abrasion Rating Values | | Wet Skid Resistance Values | |
|---|---|---|---|---|---|---|
| Cis-1,4 Poly- butadiene | SBR- 1712 | 54% Vinyl Poly- butadiene | Calcu- lated | Mea- sured | Calcu- lated | Mea- sured |
| 35 | 35 | 30 | 127 | 134 | 88 | 83 |
| 35 | 20 | 45 | 128 | 138 | 85 | 84 |
| 20 | 20 | 60 | 116 | 121 | 89 | 88 |
| 10 | 20 | 70 | 108 | 108 | 91 | 92 |

As can be seen in a comparison of the data in Tables III and V, the differences between the measured and calculated ratings for the tertiary blends employing the 45 percent medium vinyl polybutadiene are considerably higher than the differences in the ratings where a 54 percent medium vinyl poybutadiene was used.

What is claimed is:

1. A rubbery composition of matter comprising a blend of three components, A, B and C, wherein:
    component A comprises a rubbery homopolymer of 1,3-butadiene in an amount in the range of from about 10 to about 60 parts by weight based on weight of the blend, said homopolymer characterized by having at least 35 percent of the polymer in the cis configuration;
    component B comprises a rubbery copolymer of 1,3-butadiene and styrene in an amount in the range of from about 15 to about 65 parts by weight based on weight of the blend; and
    component C comprises a medium vinyl homopolymer of 1,3-butadiene in an amount in the range of from about 25 to about 75 parts by weight based on weight of the blend, said homopolymer characterized by having at least 30 but not more than 50 percent of the polymer in the vinyl configuration.

2. The composition of claim 1 wherein component A is characterized by having at least 85 percent of the polymer in the cis configuration.

3. The composition of claim 1 wherein said component B comprises from about 15 to about 30 weight percent bound styrene.

4. The composition of claim 1 wherein the amount of the component A ranges from about 20 to about 40 parts by weight based on weight of the blend;
    wherein the amount of the component B ranges from about 15 to about 40 parts by weight based on weight of the blend; and
    wherein the amount of the component C ranges from about 25 to about 50 parts by weight based on weight of the blend.

5. The composition of claim 1 wherein said component A is a solution polymerized 1,3-butadiene homopolymer, said component B is a styrene-butadiene copolymer, and said component C is a solution polymerized 1,3-butadiene homopolymer.

6. The composition of claim 1 which is vulcanized.

* * * * *